(12) United States Patent
Esmailian

(10) Patent No.: US 11,698,150 B2
(45) Date of Patent: Jul. 11, 2023

(54) PIPE HANGER

(71) Applicant: Vaeik Esmailian, Glendale, CA (US)

(72) Inventor: Vaeik Esmailian, Glendale, CA (US)

(73) Assignee: Alexo Tech Corp, Glendale, CA (US)

( * ) Notice: Subject to any disclaimer, the term of this patent is extended or adjusted under 35 U.S.C. 154(b) by 146 days.

(21) Appl. No.: 17/544,084

(22) Filed: Dec. 7, 2021

(65) Prior Publication Data

US 2022/0090702 A1    Mar. 24, 2022

(51) Int. Cl.
*F16L 3/00* (2006.01)
*F16L 3/10* (2006.01)

(52) U.S. Cl.
CPC .................. *F16L 3/1025* (2013.01)

(58) Field of Classification Search
None
See application file for complete search history.

(56) References Cited

U.S. PATENT DOCUMENTS

| | | | |
|---|---|---|---|
| 1,131,867 A | 3/1915 | Pyle | |
| 1,362,244 A * | 12/1920 | Farley | F16L 3/14 248/62 |
| 1,514,455 A | 11/1924 | Gordon | |
| 2,141,032 A * | 12/1938 | Cordell | D06F 53/04 248/74.1 |
| 4,318,518 A * | 3/1982 | Davis | F16L 3/14 248/74.3 |
| D338,827 S * | 8/1993 | Rumble | D8/380 |
| 5,542,631 A | 8/1996 | Bruno | |
| 7,559,512 B1 * | 7/2009 | diGirolamo | F16L 3/14 248/62 |
| 8,894,023 B2 * | 11/2014 | Dann | F16L 3/243 248/62 |
| 9,091,372 B2 * | 7/2015 | Lacour | F16L 3/133 |
| 2009/0224127 A1 * | 9/2009 | Heath | F16L 3/1207 248/342 |
| 2010/0314502 A1 | 12/2010 | Miles | |

OTHER PUBLICATIONS

Boyd: U.S. Pat. No. 521,149 (this form does not accept 6-digit patent Nos. in the "U.S. Patents" section above, so we cite it here). See arms D and D', lower curved portions D2 and D3, bolt F, and lips a.

(Continued)

*Primary Examiner* — Steven M Marsh
(74) *Attorney, Agent, or Firm* — The Law Office of Scot S. Fagerland, PC

(57) ABSTRACT

A clip for suspending a horizontal pipe from a ceiling joist has a cut ring for supporting the pipe, two prongs projecting from the ring, and securing holes in the prongs for securing the prongs to the joist with a nail or screw. The pipe enters the ring through the cut. The clip is then secured into a closed position, with the cut ends of the cylinder in close contact. Each prong has a lower end, which is angled slightly toward the cut, and an upper end bent at a large angle from the lower end. In closed position, the upper prongs align in parallel, with one prong directly in front of the other. The securing holes in the two prongs are then aligned so that a nail or screw can pass through both of them. The clip, ideally constructed from plastic, is inexpensive and easy to install and reuse.

12 Claims, 3 Drawing Sheets

(56) References Cited

OTHER PUBLICATIONS

Carpenter & Paterson, Inc.: "Pipe Support Hardware" catalog, http://www.pipesupports.com/sites/default/files/Catalog%206.4.1%20Master%20R0.pdf (accessed and archived Sep. 21, 2021). p. 28, Fig. 111, "Wire Pipe Hooks". This is the "bent nail" referred to in the application.

Oatey, "4-in Galvanized Hanger Iron", https://www.lowes.com/pd/Oatey-4-in-Galvanized-Hanger-Iron/1001149300 accessed and archived Sep. 21, 2021). This device discloses a prong extending radially from a ring. It also has a plurality of nail holes to provide adjustable length.

Oatey, "1/2 in. Standard Pipe Clamp", https://www.homedepot.com/p/Oatey-1-2-in-Standard-Pipe-Clamp-5-Pack-33523/301505435 (accessed and archived Sep. 21, 2021). An open ring with two prongs tangential to the ring.

* cited by examiner

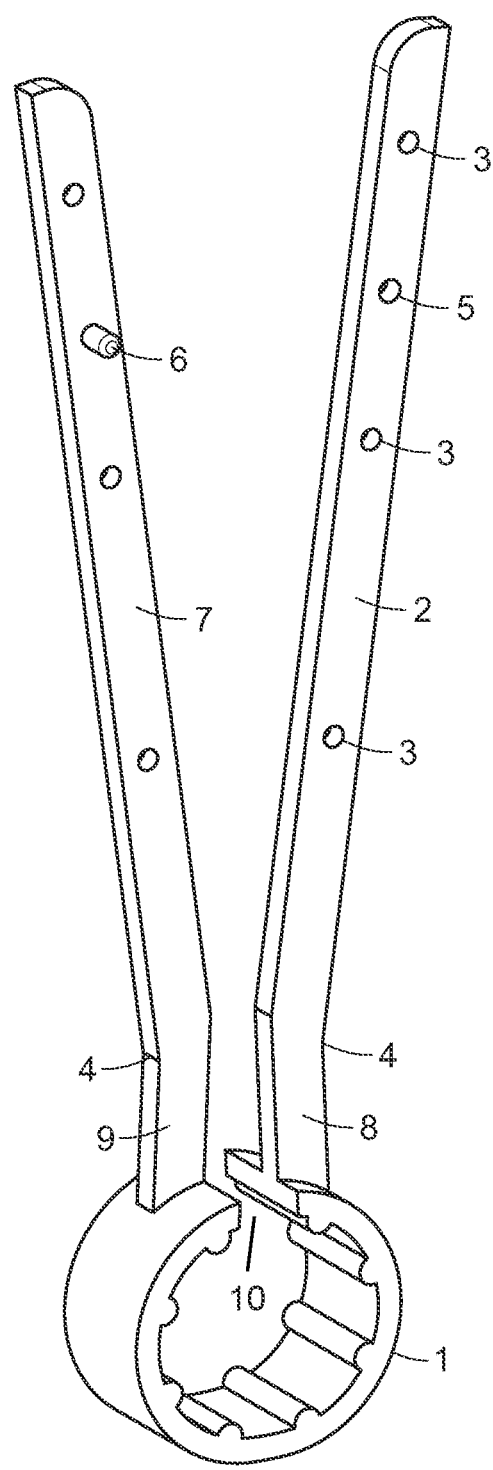
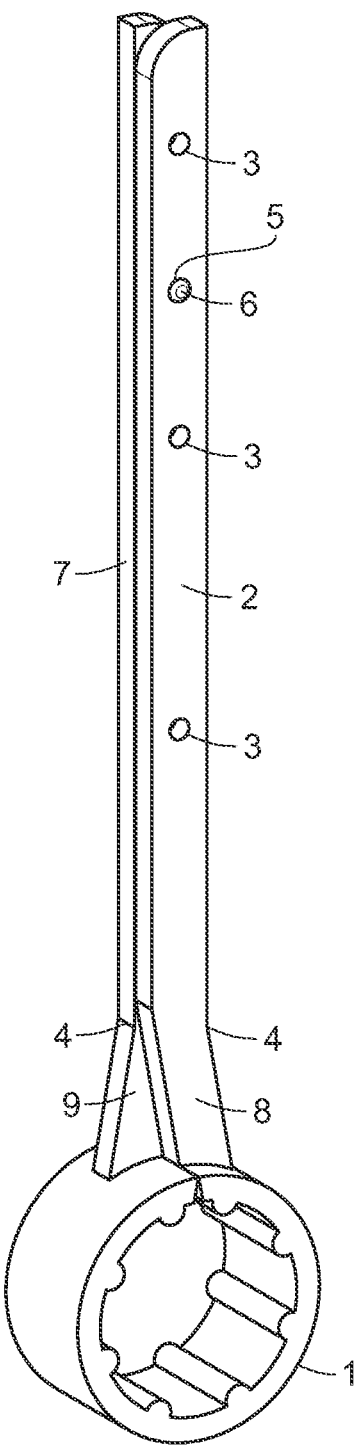
FIG. 1
FIG. 2

PIPE HANGER

1. FIELD OF THE INVENTION

This invention is in the field of plumbing accessories, specifically hangers for supporting horizontal pipes near joists.

2. BACKGROUND OF THE INVENTION

During construction of a building, horizontal pipes are generally suspended from joists underneath elevated ceilings, floors, and staircases. Pipe hangers are utilized for this purpose. Typically, one end of a pipe hanger is attached to a joist. The other end clamps around the pipe. Pipe hangers constrain pipes from movement as well as providing support against gravity.

3. DESCRIPTION OF RELATED TECHNOLOGY

One of the most common forms of pipe hanger is the "bent nail". As its name suggests, it is a long nail bent into a U-shape. The curve at the bottom of the bent nail supports the pipe. The two prongs of the "U" both have pointy ends that are hammered into a wooden joist.

Bent nails suffer a number of problems. Hammering the U-shaped nail often bends the device. When a bent nail needs to be removed or relocated, more often than not it is destroyed and not reusable. It is a difficult task to keep the slope of the pipe constant during installation.

Other products on the perform a similar function of fastening pipes to studs. Some are plastic clamps that secure the pipe in contact with the underside of the joist. Others are expensive devices with metal dowels and numerous securing mechanisms. These are apt for industrial application, but they are impractical for residential or light commercial use.

The DWV or "Drain/Waste/Vent" clamp is a pliable sheet metal clamp. It has a ring to wrap around the pipe, and one long prong with nail holes for securing to a joist. A short prong secures to the long prong to close the ring.

4. SUMMARY OF THE INVENTION

Function and Advantages of the Invention

The invention is an inexpensive, lightweight pipe hanger suitable for mass production, shipping, and storage. It is easy to install with just one nail or screw. Its hang-height is adjustable. It can be reused limitless times without compromising the device. It is easy to install in tight spots. The product also dampens pipe vibrations and noises.

Form

The invention is ideally made of plastic, as an inexpensive alternative to metallic clamps. It has an open, substantially circular ring for supporting a pipe. Attached to each end of the open ring is a prong with a plurality of attachment holes. One prong has a protrusion and the other has a complementary hole; the ring is closed when the protrusion is snapped into the complementary hole. The prongs have a "scissors" configuration, with a front prong and a rear prong. In closed position, the rear prong is behind the front prong so that the attachment holes in the two prongs align. Finally, a nail or screw is driven through one pair of attachment holes to secure the hanger to a joist. To the best of my knowledge, the "scissors" configuration of the device and its snaplock mechanism are novel designs in pipe hangers.

5. BRIEF DESCRIPTION OF THE DRAWINGS

FIG. 1 is a perspective view of the pipe hanger in open position.

FIG. 2 is a perspective view of the pipe hanger in closed position.

6. DETAILED DESCRIPTION OF THE PREFERRED EMBODIMENTS

Figure 3:
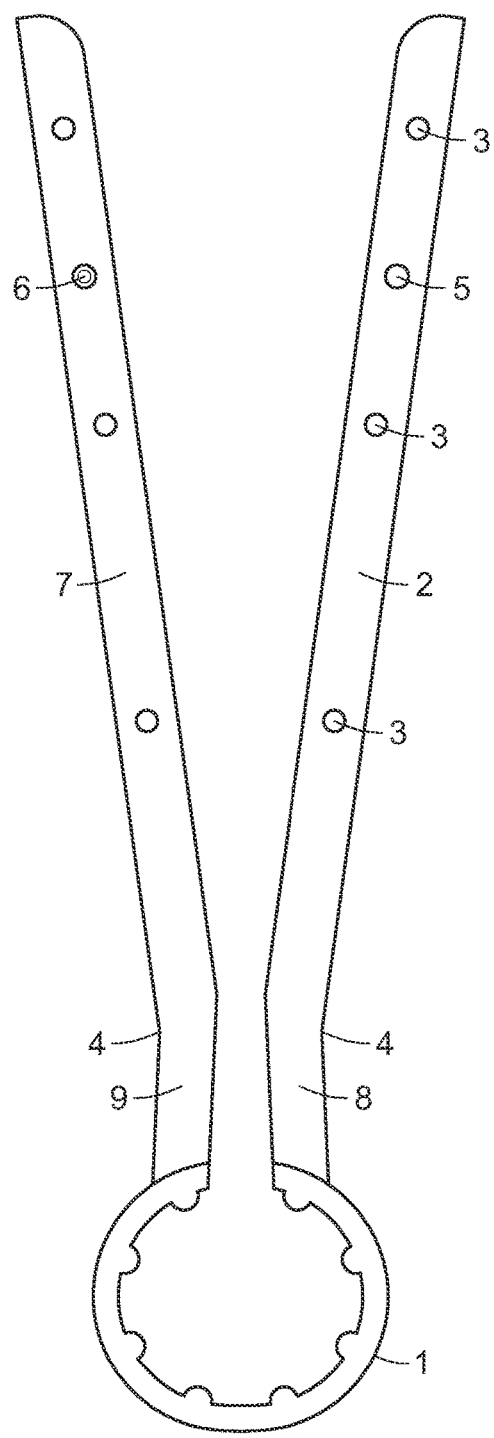
FIG. 3 is a front view of the pipe hanger in open position.

All parts of the invention are best seen in FIG. 1. Ring 1 assumes the form of a cut cylinder. The cut 10 allows the ring to open as widely as possible to accommodate a pipe. Attached to a first end of the cylinder is a front lower prong 8. Attached to a second end of the cylinder is a rear lower prong 9. The front lower prong is attached further to the "front" end of the cylinder than the rear lower prong. When the cylinder is closed around a pipe, the front and rear lower prongs do not block each other; rather, they slide past each other like the blades in a pair of scissors.

A front upper prong 2 protrudes from the front lower prong 8. A rear upper prong 7 protrudes from the rear lower prong 9. Each upper prong meets its corresponding lower prong at a bend 4. Each bend 4 is ideally within 2° of a 175° angle.

A protrusion 6 is attached to the rear upper prong 7. The front upper prong 2 has a closure hole 5, roughly the same diameter as the protrusion. The protrusion fits into the closure hole like a snap, effectively closing the pipe hanger with a tight grip on the pipe.

Figure 4:
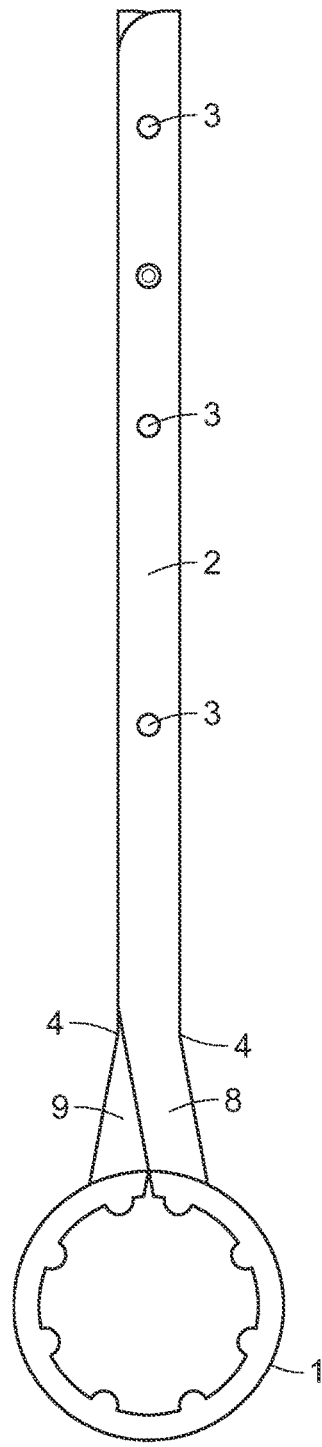
FIG. 4 is a front view of the pipe in closed position; only the front prong is visible.
Figure 5:
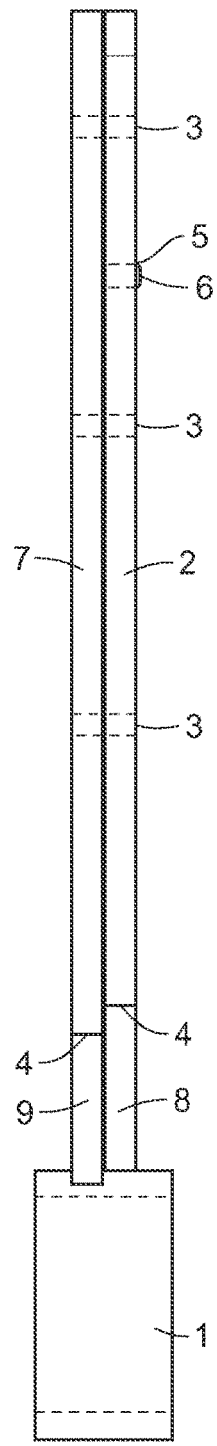
FIG. 5 is a side view of the pipe in closed position; both prongs are visible.
Figure 6:
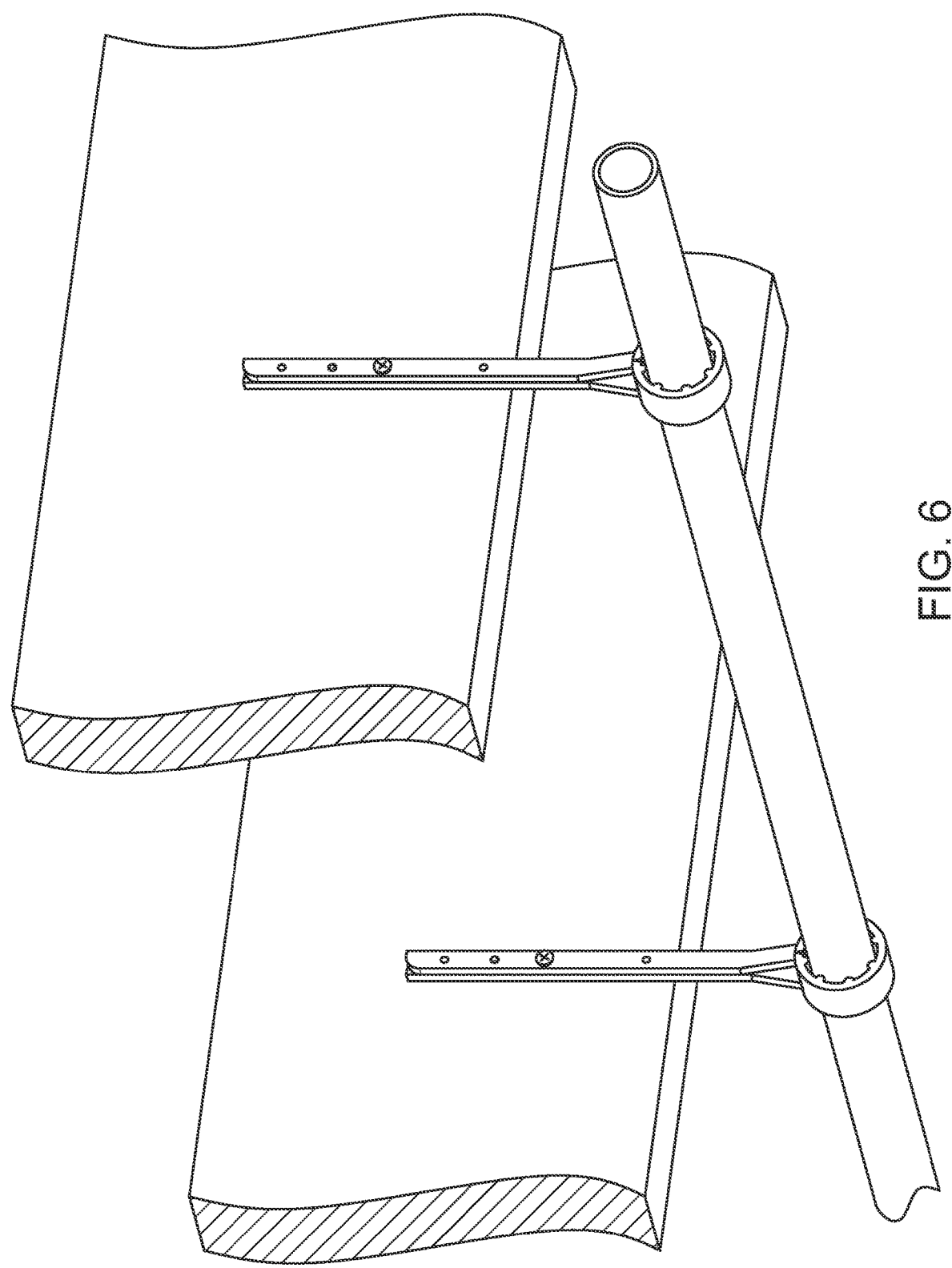
FIG. 6 shows two pipe hangers being used to support a pipe to joists. Rotate the page clockwise; the ceiling is at the left side of the drawing.

When the pipe hanger is closed, the rear upper prong 7 is aligned perfectly behind the front upper prong 2. This is a result of the bends in the prongs. Since each prong is attached to the ring 1 at some distance from the cut 10, each lower prong must angle toward the cut. Each lower prong's angle of inclination toward the cut is supplementary to the bend, i.e. within 2° of 5° from vertical. At the point where each prong is collinear with the cut and the center of the ring, the prong makes its bend of roughly 175°. Thus, the upper prongs extend radially from the cut in the ring, in parallel to one another. FIG. 4 shows the front view, when only the front upper prong is visible because the rear upper prong is aligned perfectly behind it. FIG. 5 shows a side view, in which both upper prongs are visible in profile.

Each upper prong is perforated with a plurality of securing holes 3. When the ring is closed and the prongs are behind each other, the securing holes of the front prong align with the securing holes of the rear prong, as best seen in FIG. 5. A single nail or screw through one pair of securing holes will now secure the pipe hanger to a joist. Multiple closure holes are provided for purposes of adjustable height and length. It may be desirable to hang a pipe lower on one end than the other. Some joists may be higher or taller than others.

Note that, after the pipe hanger is installed, it is easy to uninstall and reuse. For example, if it is secured with a screw, a drill can easily remove the screw in a matter of seconds. Neither installation nor removal damages the device, so it may be reused any number of times.

I claim:

1. A clip for supporting a horizontal pipe from a ceiling joist, comprising:
   a ring in the form of an open cylinder, with a center, a front face, a rear face, a first end, a second end, and a cut between the first end and the second end;
   a front lower prong attached to the first end of the ring near the front face of the ring;
   a rear lower prong attached to the second end of the ring near the rear face of the ring;
   each lower prong protruding from the ring, deviating from radial protrusion in the amount of a first angle toward the cut;
   a front upper prong extending from the front lower prong;
   a rear upper prong extending from the rear lower prong;
   a bend between each lower prong and its corresponding upper prong, at a second angle supplementary to the first angle, so that, when the first end of the ring is brought into contact with the second end of the ring in a closed position, the upper prongs extend radially from the ring, collinear with the center of the ring and the cut, and the rear upper prong is positioned directly to the rear of, and parallel to, the front upper prong;
   and a plurality of securing holes in each upper prong, each securing hole in the front upper prong being equidistant from the center of the ring as a corresponding securing hole in the rear upper prong, so that, when the clip is in the closed position, the securing holes in the rear upper prong align with the securing holes in the front upper prong.

2. The clip of claim 1, in which the first angle is between 3° and 7°, inclusive.

3. The clip of claim 1, constructed of plastic.

4. The clip of claim 1, further comprising a closure mechanism to secure the clip in its closed position.

5. The clip of claim 4, in which the closure mechanism is specifically a snap mechanism, comprising
   a protrusion on one of the prongs, with a snap diameter, at a snap distance from the center of the ring;
   and a closure hole on the other prong, with the snap diameter, at the snap distance from the center of the ring;
   so that, when the clip is in closed position, the protrusion snaps into the closure hole.

6. The clip of claim 2, constructed of plastic.

7. The clip of claim 2, further comprising a closure mechanism to secure the clip in its closed position.

8. The clip of claim 7, in which the closure mechanism is specifically a snap mechanism, comprising
   a protrusion on one of the prongs, with a snap diameter, at a snap distance from the center of the ring;
   and a closure hole on the other prong, with the snap diameter, at the snap distance from the center of the ring;
   so that, when the clip is in closed position, the protrusion snaps into the closure hole.

9. The clip of claim 3, further comprising a closure mechanism to secure the clip in its closed position.

10. The clip of claim 9, in which the closure mechanism is specifically a snap mechanism, comprising
    a protrusion on one of the prongs, with a snap diameter, at a snap distance from the center of the ring;
    and a closure hole on the other prong, with the snap diameter, at the snap distance from the center of the ring;
    so that, when the clip is in closed position, the protrusion snaps into the closure hole.

11. The clip of claim 6, further comprising a closure mechanism to secure the clip in its closed position.

12. The clip of claim 11, in which the closure mechanism is specifically a snap mechanism, comprising
    a protrusion on one of the prongs, with a snap diameter, at a snap distance from the center of the ring;
    and a closure hole on the other prong, with the snap diameter, at the snap distance from the center of the ring;
    so that, when the clip is in closed position, the protrusion snaps into the closure hole.

* * * * *